United States Patent
Baca et al.

(10) Patent No.: US 10,574,649 B2
(45) Date of Patent: *Feb. 25, 2020

(54) AUTHENTICATING TO A NETWORK VIA A DEVICE-SPECIFIC ONE TIME PASSWORD

(71) Applicant: INTEL CORPORATION, Santa Clara, CA (US)

(72) Inventors: Jim S. Baca, Corrales, NM (US); Tobias M. Kohlenberg, Portland, OR (US); Hong Li, Folsom, CA (US); David Stanasolovich, Hillsboro, OR (US); Mark H. Price, Placitas, NM (US); Steven J. Birkel, Portland, OR (US); Kenneth W. Reese, Portland, OR (US); Ronald Tafoya, Sandia Park, NM (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/117,285

(22) Filed: Aug. 30, 2018

(65) Prior Publication Data

US 2018/0375854 A1  Dec. 27, 2018

Related U.S. Application Data

(63) Continuation of application No. 15/188,258, filed on Jun. 21, 2016, now Pat. No. 10,075,434, which is a
(Continued)

(51) Int. Cl.
*H04L 29/06* (2006.01)
*G06F 21/31* (2013.01)
(Continued)

(52) U.S. Cl.
CPC .......... *H04L 63/0838* (2013.01); *G06F 21/31* (2013.01); *H04L 9/3228* (2013.01);
(Continued)

(58) Field of Classification Search
None
See application file for complete search history.

(56) References Cited

U.S. PATENT DOCUMENTS

| 6,715,082 B1 | 3/2004 | Chang |
| 7,752,450 B1 | 7/2010 | Palmer et al. |

(Continued)

FOREIGN PATENT DOCUMENTS

| JP | 2000194657 | 7/2000 |
| JP | 2005025610 | 1/2005 |

(Continued)

OTHER PUBLICATIONS

Notice of Allowance in European Patent Application No. 11878626.8, dated Jan. 30, 2019, 28 pages.
(Continued)

*Primary Examiner* — Maung T Lwin
(74) *Attorney, Agent, or Firm* — Grossman, Tucker, Perreault & Pfleger, PLLC

(57) ABSTRACT

Generally, this disclosure describes a method and system for authenticating to a network via a device-specific one-time password. A method in an embodiment may include generating a first one-time password (OTP) based at least in part on a plurality of client device attributes; and providing the first OTP to an authenticator associated with a private network during a first session, wherein the authenticator is configured to authenticate the client device to at least one of the private network and protected content included in the private network for a second session following the first session based on the provided first OTP.

15 Claims, 4 Drawing Sheets

Related U.S. Application Data continuation of application No. 13/997,197, filed as application No. PCT/US2011/067437 on Dec. 27, 2011, now Pat. No. 9,380,026.

(51) Int. Cl.
  *H04W 12/06* (2009.01)
  *H04L 9/32* (2006.01)

(52) U.S. Cl.
  CPC ...... *H04L 63/0263* (2013.01); *H04L 63/0272* (2013.01); *H04W 12/06* (2013.01)

(56) References Cited

U.S. PATENT DOCUMENTS

| | | | |
|---|---|---|---|
| 8,087,074 B2* | 12/2011 | Popp | H04L 9/3228 726/9 |
| 8,627,424 B1 | 1/2014 | O'Malley | |
| 8,832,788 B1 | 9/2014 | Gibson | |
| 2003/0163694 A1 | 8/2003 | Chen | |
| 2005/0169288 A1 | 8/2005 | Kamiwada | |
| 2006/0041759 A1* | 2/2006 | Kaliski, Jr. | G06F 21/31 713/184 |
| 2006/0136739 A1 | 6/2006 | Brock | |
| 2007/0016943 A1 | 1/2007 | M'Raihi | |
| 2007/0091689 A1 | 4/2007 | Hsu | |
| 2007/0113294 A1 | 5/2007 | Field | |
| 2007/0130474 A1* | 6/2007 | Shatford | H04L 9/12 713/184 |
| 2008/0034216 A1 | 2/2008 | Law | |
| 2008/0098466 A1 | 4/2008 | Yoshida et al. | |
| 2008/0168544 A1 | 7/2008 | von Krogh | |
| 2008/0208758 A1 | 8/2008 | Spiker | |
| 2008/0301791 A1 | 12/2008 | Smith et al. | |
| 2009/0064294 A1 | 3/2009 | Cook | |
| 2009/0104888 A1 | 4/2009 | Cox | |
| 2009/0125997 A1 | 5/2009 | Cook | |
| 2009/0165099 A1 | 6/2009 | Eldar et al. | |
| 2009/0172402 A1 | 7/2009 | Tran | |
| 2009/0178128 A1* | 7/2009 | Chiba | H04L 67/125 726/7 |
| 2009/0307767 A1 | 12/2009 | Semba | |
| 2009/0313691 A1 | 12/2009 | Chien | |
| 2010/0017860 A1 | 1/2010 | Ishida | |
| 2010/0180328 A1 | 7/2010 | Moas et al. | |
| 2011/0321146 A1 | 12/2011 | Vernon et al. | |
| 2012/0042365 A1 | 2/2012 | Shoval | |
| 2012/0192253 A1 | 7/2012 | Betsch | |
| 2013/0139222 A1 | 5/2013 | Krillin | |
| 2013/0159195 A1* | 6/2013 | Kirillin | G06Q 20/322 705/71 |
| 2013/0191899 A1 | 7/2013 | Eldefrawy | |

FOREIGN PATENT DOCUMENTS

| | | |
|---|---|---|
| WO | 2007126227 | 11/2008 |
| WO | 2012005744 A1 | 1/2012 |

OTHER PUBLICATIONS

Chinese Office Action issued in Chinese Application No. 201180075982.5, dated Jul. 4, 2016, with English translation, 12 pages.
Korean Office Action received for Korean Patent Application No. 2014-7017727, dated May 14, 2015, 4 pages of English Translation and 5 pages of Korean Office Action.
Japan Office Action from related Application No. 2014-550248, dated Jul. 21, 2015, 2 pages.
Supplementary European Search Report from related Application No. 11878626 dated Sep. 16, 2015, 8 pages.
Menezes et al., "Handbook of Applied Cryptography", CRC Press, LLC, 1997, pp. 384-424.
Korean Office Action received for Korean Patent Application No. 2014-7017727, dated Sep. 30, 2015, with English Translation, 9 pages.
International Preliminary Report on patentability and Written Opinion received for PCT Patent Application No. PCT/US2011/067437, dated Jul. 10, 2014, 10 pages.
International Search Report and Written Opinion received for PCT Patent Application No. PCT/US2011/067437, dated Sep. 24, 2012, 9 pages.
Office Action issued in U.S. Appl. No. 13/997,197, dated Jun. 19, 2015, 11 pages.
Notice of Allowance issued in U.S. Appl. No. 13/997,197, dated Feb. 25, 2016, 18 pages.
Chinese Office Action issued in Chinese Application No. 201180075982.5, dated Mar. 7, 2017, with English machine translation, 16 pages.
Japanese Office Action issued in Japanese Application No. 2014-550248, dated Jun. 13, 2017, with English machine translation, 7 pages.
Chinese Office Action issued in Chinese Application No. 201180075982.5, dated Jul. 14, 2017, with English machine translation, 10 pages.
Chinese Office Action issued in Chinese Application No. 201180075982.5, dated Nov. 29, 2017, with English translation, 6 pages.
Office Action issued in U.S. Appl. No. 15/188,258, dated Jul. 28, 2017, 31 pages.
Office Action issued in U.S. Appl. No. 15/188,258, dated Nov. 30, 2017, 22 pages.
Notice of Allowance issued in U.S. Appl. No. 15/188,258, dated May 10, 2018, 23 pages.
Extended European Search Report received in European Patent Application No. 19180978.9, dated Sep. 23, 2019.

* cited by examiner

AUTHENTICATING TO A NETWORK VIA A DEVICE-SPECIFIC ONE TIME PASSWORD

CROSS REFERENCE TO RELATED APPLICATIONS

This application is a Continuation of U.S. application Ser. No. 15/188,258 filed Jun. 21, 2016, which is a continuation of U.S. application Ser. No. 13/997,197 filed Apr. 14, 2014, now U.S. Pat. No. 9,380,036 issued Jun. 28, 2016, which is a National Stage Entry of PCT/US2011/067437 filed on Dec. 27, 2011, all of which are incorporated herein by reference in their entirety.

FIELD

This disclosure relates to authenticating to a network, more particularly to authenticating to a network via a device-specific one time password.

BACKGROUND

Many businesses have a private network. The private network may include a local area network (LAN) and/or an enterprise network. Workers may wish to access these private networks remotely via a public network such as the Internet. Techniques exist for providing access to private networks over the public network and for providing secure, encrypted transmission of messages and data between a user's computing device and the private network over the public network. One such technique is a virtual private network (VPN).

The private network may be configured to prevent unauthorized users from accessing the private network and to allow only authorized users to access the private network and/or information stored in the private network. Recognizing such authorized users typically relies on verifying the identity of the user, i.e., authenticating the user to the network. Typically, a user may be asked to provide a username and password in order to authenticate to and access the private network. In some circumstances, the user may be asked to provide additional authentication such as a passcode.

A user that wishes to access a private network with a computing device may authenticate to the computing device using a username and password then may be requested to authenticate to the private network with another password and possibly another username. To ensure security, passwords should be changed relatively frequently. The user must then either remember the passwords or record them for later retrieval. Neither technique is particularly reliable and a recorded password may be retrieved by someone other than the user, potentially compromising security.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Figure 1:
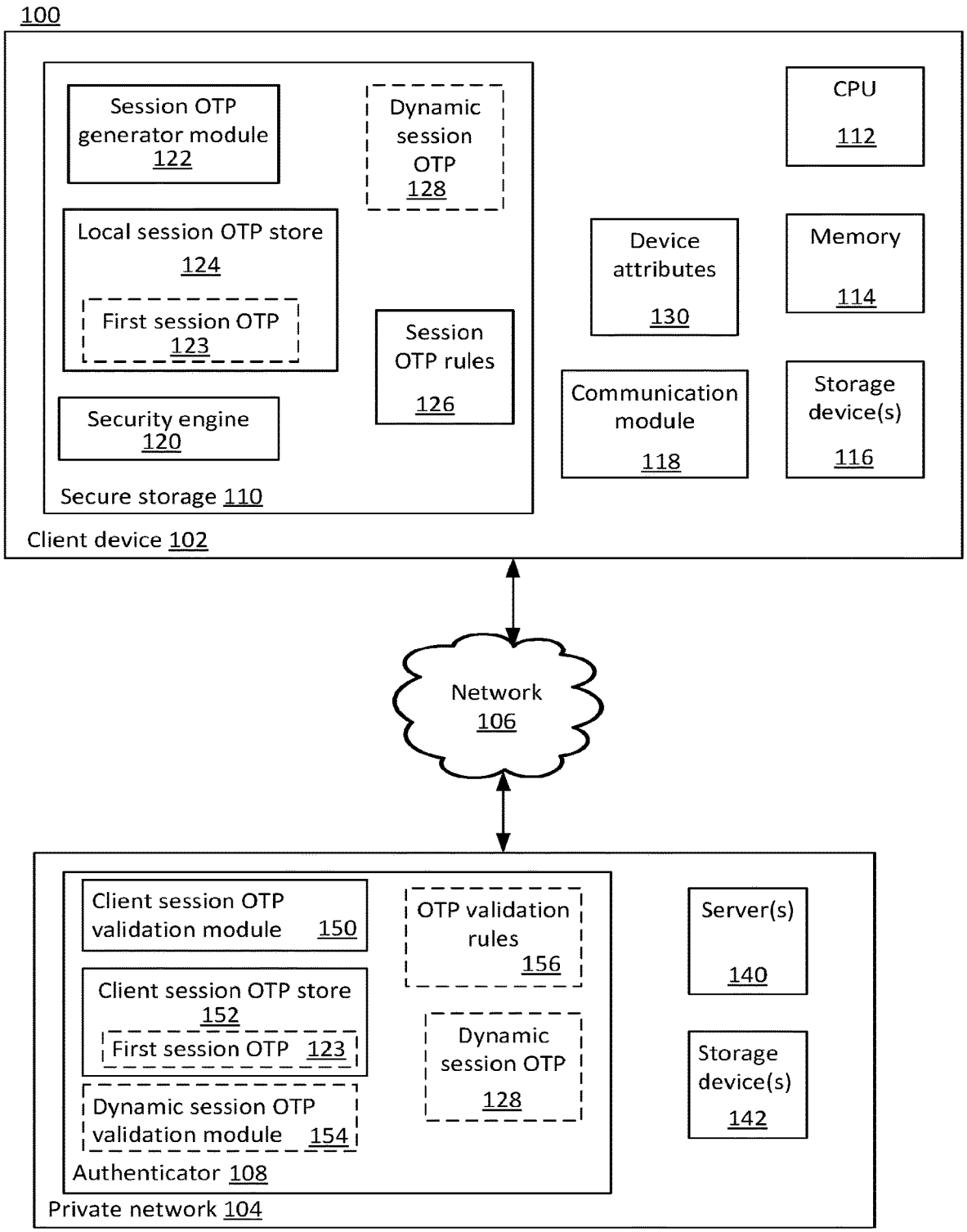
FIG. 1 illustrates a device-specific one time password authentication system consistent with various embodiments of the present disclosure.

Although the following Detailed Description will proceed with reference being made to illustrative embodiments, many alternatives, modifications, and variations thereof will be apparent to those skilled in the art.

DETAILED DESCRIPTION

Generally, this disclosure describes a method and system for authenticating to a private network using a one-time password (OTP). A client device is configured to generate a one-time password based at least in part on device attributes. Device attributes may include, but are not limited to, file system attributes, device settings (both software and hardware), hardware features and device (user) context.

Device attributes are typically device-specific and may not be duplicated on another device. The specific device attributes used for generating the OTP may be selectable by, for example, a system administrator, as described herein. The OTP may be generated by the client device during a session when the device is connected to the private network. The OTP may then be saved on the client device and provided to an authenticator associated with the private network. The OTP may then be used to authenticate the client device to the private network at a next session. Thus, a client device may be authenticated to a private network with a potentially unique, random OTP based on device attributes that may not be duplicated on another device. The user may then not be required to remember such a password. The user may authenticate to the client device and the client device may then authenticate to the private network.

The session OTP may be used to authenticate the client device to the private network. The session OTP may similarly be used to control access to protected content included in the private network. The content may include information, data and/or applications. A client device that has authenticated to the private network using a session OTP may be configured to provide further authentication to access the protected content. The further authentication may include a static session OTP and/or a second (dynamic) session OTP, as described herein.

In an embodiment, a second authentication may be performed. In this embodiment, the client device may be configured to generate a second (dynamic) OTP, based on device attributes, at the time of the authentication. The authenticator may be configured to decide a successful authentication if the second OTP is within a predetermined tolerance of the saved OTP provided by the client device during a prior session. The second authentication is configured to verify that the client device that generated the stored session OTP is the client device that is attempting the second authentication.

For example, selected file system attributes may be used to generate a device-specific session OTP. The file system attributes may be selected based on predetermined rules defined by, for example, a system administrator. In this example, the selected file system attributes may correspond to a specified region or regions of a hard disk included in the client device. The selected regions may be static or may be configured to change relatively infrequently. The selected regions may be scanned, and data stored in the scanned regions may be captured. The captured data may then be processed to generate the device-specific OTP. For example, the captured data may be processed using a cryptographic hash function configured to provide an OTP of a desired size. Thus, a device-specific OTP may be generated based on device-specific device attributes.

FIG. 1 illustrates a device-specific one-time password authentication system 100 consistent with various embodiments of the present disclosure. The system 100 generally includes a client device 102, private network 104 and a network 106. The private network 104 generally includes an authentication server "authenticator" 108, one or more server(s) 140 and one or more storage device(s) 142. Storage device(s) 142 may include hard disk drive(s) and/or other storage mediums, as described herein. The authenticator 108 may be included in the private network 104 and/or may be associated with the private network 104 (e.g., gateway). A user may use client device 102 to access private network 104 via network 106. Network 106 may be a public network, e.g., the Internet.

Client device 102 may include secure storage 110, a processor "CPU" 112, memory 114, one or more storage device(s) 116 and a communication module 118. "Client device" as used herein means any computing device, including, but not limited to, mobile telephones, smartphones, tablet computers, notebook computers, desktop computers, ultraportable computers, ultramobile computers, netbook computers, subnotebook computers, personal digital assistants, enterprise digital assistants, mobile internet devices and similar devices. CPU 112 is configured to perform operations associated with applications and/or modules in client device 102. Memory 114 is configured to store applications and/or data for client device 102. Storage device(s) 116 may include, hard disk drives, removable storage devices, and/or other storage mediums, as described herein. Communication module 118 is configured to provide network connectivity for client device 102. Communication device 118 may be configured to connect to network 106 wired or wirelessly, using one or more communication protocols.

Secure storage 110 is configured to limit access to elements included within the secure storage 110. Secure storage 110 includes a security engine 120, a session OTP generator module 122, a local session OTP store 124 that may include session OTP 123, session OTP rules 126 and may include a dynamic session OTP 128. The security engine 120 is configured to manage the secure storage 110, control access to the secure storage 110 and may be configured to perform cryptographic and/or hashing operations.

Session OTP generator module 122 is configured to generate a first (static) session OTP 123 based on device attributes 130 and session OTP rules 126. The session OTP generator 122 may be further configured to generate a second (dynamic) session OTP 128, as described herein. A static session OTP 123 may be generated just prior to a current session ending. The static session OTP 123 may then be utilized to authenticate the client device 102 to private network 104 at a next session. In some embodiments, the static session OTP 123 may include a date field configured to include an expiration date of the static session OTP 123.

The session OTP generator module 122 is configured to scan client device 102 and to select a plurality of device attributes based on session OTP rules 126. The selected plurality of device attributes may then be selectively combined, encrypted and/or hashed by session OTP generator module 122 based, at least in part, on session OTP rules 126. Hashing is configured to provide a session OTP of a desired length (size). The result may then be stored in local static session OTP store 124 and provided to authenticator 108 to be stored for later use.

Device attributes 130 include, but are not limited to, file system attributes, hardware features, software configuration settings and user context. File system attributes include directories (folders), subdirectories (subfolders), files and file-specific information (file location, file name, author, date/time stamp, file size, file type, strings within a file, file statistics and/or other file specific information) and/or other file system attributes. Hardware features include memory size, MAC address, storage device strings, graphic properties and/or other hardware features. User context includes user (client device 102) location, user profiles, user biometrics and/or other user context data. Device attributes 103 may include any device-specific attributes. Thus, device-specific attributes include a plurality of device-specific data that may not be duplicated on another device.

Session OTP rules 126 are configured to define which device attributes are selected, a number of device attributes selected and may be configured to define hashing parameters. The session OTP rules 126 may be determined by, for example, a system administrator associated with private network 104. The specific device attributes selected and the number of device attributes selected may be based on a level of security desired. For example, selecting a greater number of device attributes is more likely to result in a unique OTP compared to selecting a lesser number of device attributes. Session OTP rules 126 may include selecting at least some device attributes that change relatively infrequently. Session OTP rules 126 may include at least some random functionality. The random functionality may be configured to ensure that each generated OTP is likely unique relative to previously or later generated OTPs. For example, the specific device attributes may be selected randomly. In another example, the number of device attributes selected may be random and may be constrained to be greater than a threshold number. Thus, a generally unique OTP may be generated based on a plurality of device attributes.

For example, if the device attribute selected includes configuration settings for an application, then user profile attribute string(s) may be used to generate the session OTP. The user profile attribute string(s) may be scanned and captured. The captured data may be hashed to produce the session OTP. Hashing parameters may be configured to provide a session OTP of a specified size.

The generated session OTP 123 may be stored on the client device 102 in the local session OTP store 124 and may be provided to the authenticator 108. The authenticator 108 is configured to provide authentication services for private network 104. The authenticator 108 includes a client session OTP validation module 150 and a client session OTP store 152 and may include a dynamic session OTP validation module 154 and OTP validation rules 156.

The client session OTP validation module 150 is configured to receive a session OTP, e.g., first session OTP 123, from the client device 102 and to manage validating a client session OTP. The session OTP 123 is configured to be used to authenticate the client device 102 at a next session, as described herein. The authenticator 108 is configured to store the received session OTP 123 in the client session OTP store 152 for the later use. Thus, once a session OTP has been generated by the client device 102, the generated session OTP 123 may be stored in the local session OTP store 124 of the client device 102 and the client session OTP store 152 of the authenticator 108.

When a user wishes to access the private network 104 using client device 102, the user may authenticate himself or herself to the client device 102 and the client device 102 may then attempt to authenticate to private network 104. The session OTP stored in the local session OTP store 124 ("local session OTP") may be provided to the authenticator 108 as part of the authentication process. The client session OTP validation module 150 is configured to receive the local session OTP and to compare the received local session OTP to the session OTP stored in client session OTP store 152 ("client session OTP"). If the local session OTP corresponds to the client session OTP, then the client device 102 may be authenticated to the private network 104 and access may be allowed.

When the client device 102 receives an indication that the session is ending, the session OTP generator module 122 is configured to generate a new session OTP, to store the new session OTP in the local session OTP store 124 and to provide the new session OTP to the authenticator 108. The authenticator 108 may then store the received new session OTP in the client session OTP store 152 for use at a next session.

Thus, a unique device-specific session OTP may be generated and stored during a current session for authenticating the client device 102 to the private network 104 at a next session. The unique device-specific session OTP or another device-specific session OTP may be utilized to authenticate client device 102 for access to protected content in the private network. The session OTP may be generated based on client device attributes 130 and session OTP rules 126. A user may not be required to remember an often changed password for accessing private network 104. The session OTP corresponds to a shared secret between the client device 102 and the private network 104.

In some situations, it may be desirable to request a second authentication for access to the private network 104 and/or protected content in the private network 104. Such second authentication is configured to provide a relatively higher level of security than may be available with only a first authentication. The second authentication is configured to confirm that a device attempting to authenticate is the client device 102 that provided the first session OTP 123 at a prior session. The first authentication may be performed with a first (static) session OTP, as described herein. The second authentication may then be performed with a second (dynamic) session OTP. The first session OTP may be generated by the client device 102, stored in the client device 102 and provided to the authenticator 108 to be stored for use at a next session, as described herein. The first session OTP thus exists in the client device 102 prior to the next session. The second (dynamic) session OTP is configured to be generated at the time of the authentication attempt rather than during a prior session. Thus, the second session OTP is generated based on device attributes at the time of the authentication. The second authentication is configured to confirm that the device attempting to authenticate to the private network is the client device 102 that provided the first session OTP 123 stored in the authenticator 108.

If a second (dynamic) authentication is requested (based on policy), a second dynamic session OTP 128 may be generated based on device attributes 130 and session OTP rules 126. The session OTP rules 126 used for generating the second (dynamic) session OTP 128 correspond to the session OTP rules 126 used to generate the first (static) session OTP 123. In other words, the same rules may be used to generate both the first session OTP 123 and the second session OTP 128. Similarly, the same device attributes 130 may be used for generating both the first session OTP 123 and the second session OTP 128. However, values associated with the device attributes may have changed between generation of the first session OTP 123 and generation of the second session OTP 128. For example, a file may have been edited. In another example, a device setting may have changed. In another example, device context, e.g., location, may have changed. Thus, a tolerance (i.e., a range) may be utilized when evaluating whether the second session OTP 128 corresponds to the first session OTP 123. If the second session OTP 128 is within the tolerance of the first session OTP 123, then the second authentication may be deemed successful.

The dynamic session OTP validation module 154 is configured to perform the second authentication based, at least in part, on OTP validation rules 156. The OTP validation rules 156 may include tolerance parameter(s) to be utilized for the second validation. The second (dynamic) session OTP 128 may be generated in response to the request for the second authentication. The second session OTP 128 may be generated by the session OTP generator module 122 and provided to the authenticator 108. The dynamic session OTP validation module 154 is configured to receive the second session OTP 128, to compare the second session OTP 128 to the first (static) session OTP 123 from the client session OTP store 152 and to determine whether the second session OTP 128 corresponds to the first (static) session OTP 123 based on OTP validation rules 156.

For example, the device attributes selected as a basis for generating a session OTP may include file system attributes. The file system may be scanned and data captured in a plurality of random locations within a predefined range. A secure hash may then be applied to the scanned (and captured) attributes to generate the session OTP. The secure hash may be configured to yield a session OTP of a desired size. The session OTP may then be provided to authenticator 108. The authenticator 108 may store the session OTP and may include a time stamp with the stored session OTP. If a second authentication is requested, the file system may be scanned at a plurality of locations within the same range. The captured scan results may be hashed to generate the second (dynamic) OTP. The second OTP may be provided to authenticator 108. The authenticator 108 may then compare the stored session OTP with the dynamic OTP. Since file system attributes may have changed between generating the first session OTP and generating the second session OTP, client device may be validated if the second session OTP corresponds to the first session OTP within a predetermined percentage (e.g., 90%).

In another example, device attributes may include time stamps. In this example, hardware attributes may be utilized to generate the first session OTP and the second session OTP. In this example, hardware attribute changes below a threshold for a predetermined time interval may result in a successful validation while hardware attribute changes above the threshold for the predetermined time interval may result in validation failure.

Figure 2:
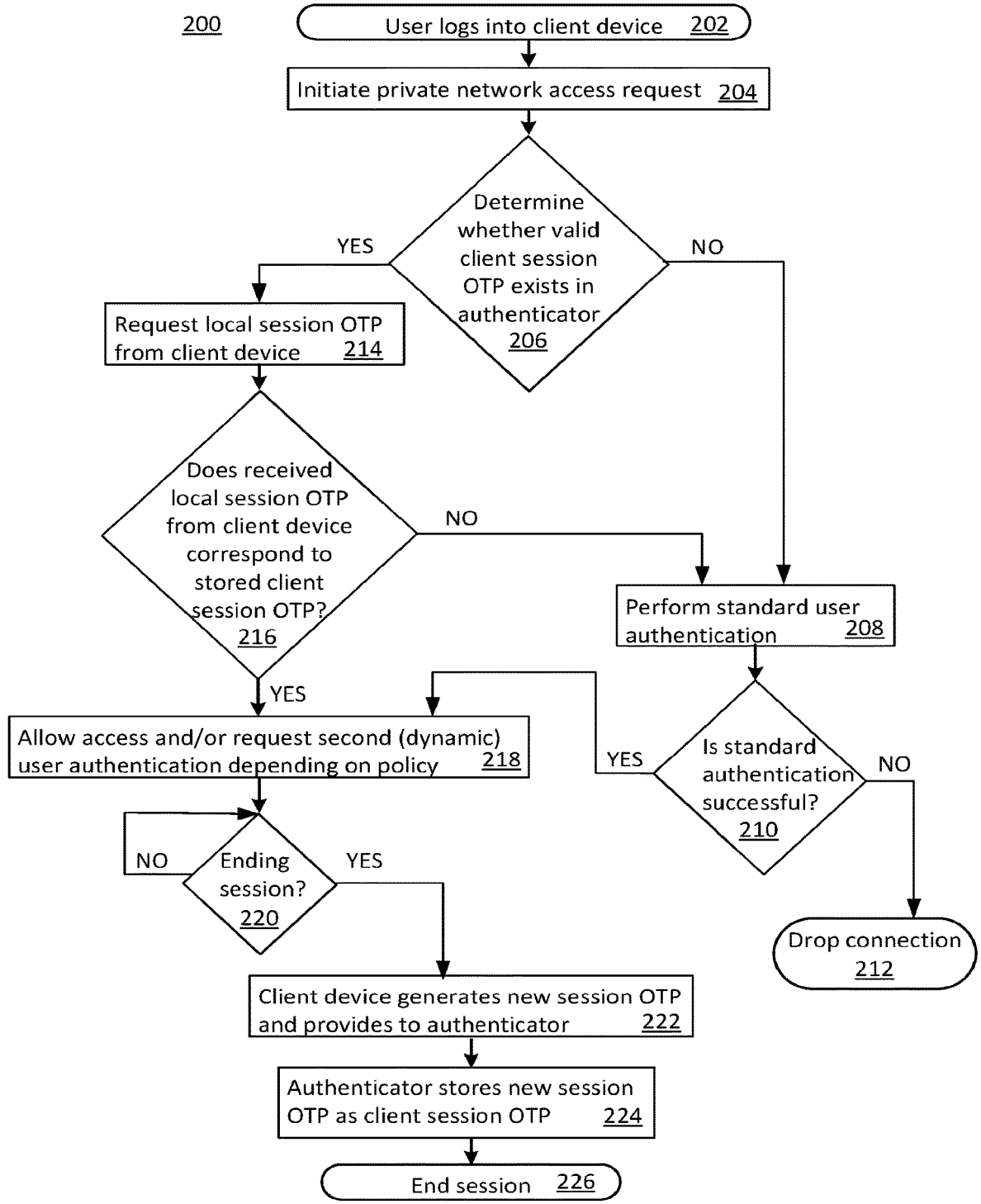
FIG. 2 illustrates a flowchart of exemplary operations of a device-specific one time password authentication system consistent with various embodiments of the present disclosure.

FIG. 2 illustrates a flowchart 200 of exemplary operations of a device-specific OTP authentication system consistent with various embodiments of the present disclosure. The operations of flowchart 200 may be performed by a client device, e.g., client device 102, and/or an authenticator, e.g., authenticator 108. In particular flowchart 200 depicts exemplary operations configured to authenticate a client device to a private network using a device-specific OTP, consistent with the present disclosure.

The operations of flowchart 200 may begin 202 with a user logging into a client device. A private network access request may be initiated at operation 204. Whether a valid client session OTP exists in the authenticator may be determined at operation 206. If a valid client session OTP does not exist in the authenticator, a standard user authentication may be performed at operation 208. Whether the standard authentication is successful may be determined at operation 210. If the standard authentication is unsuccessful, the connection may be dropped at operation 212. If the standard authentication is successful, program flow may proceed to operation 218, as described herein.

Returning to operation 206, if a valid client session OTP exists in the authenticator, a local session OTP may be requested from the client device at operation 214. Whether the received local session OTP corresponds to the client session OTP stored in the authenticator may be determined at operation 216. If the received local session OTP does not correspond to the stored client session OTP, the standard user authentication may be performed at operation 208. If the local session OTP corresponds to the stored client session OTP, access may be allowed and/or a second (dynamic) user authentication may be requested, depending on policy, at operation 218. Whether the session is ending may be determined at operation 220. If the session is ending, a new session OTP may be generated by the client device and provided to the authenticator at operation 222. The new session OTP may be stored by the authenticator as client session OTP at operation 224. The session may then end at operation 226.

Figure 3:
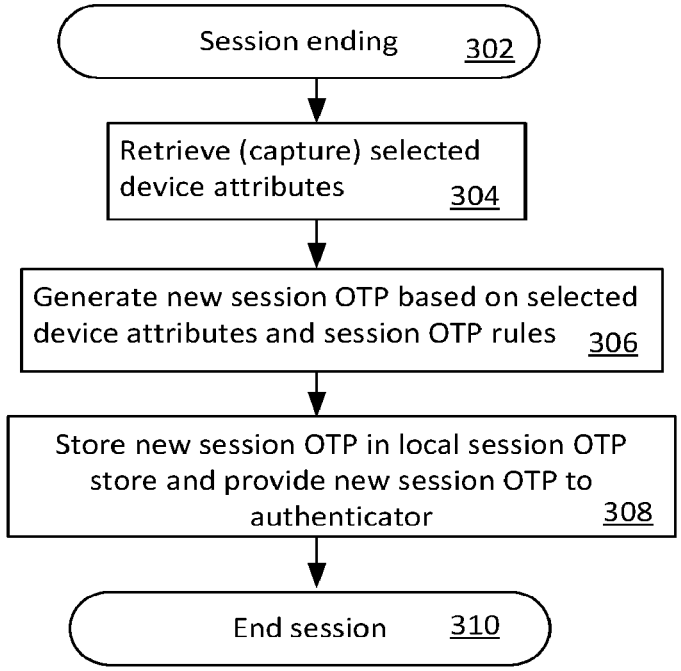
FIG. 3 illustrates a flowchart of exemplary operations of a client device configured to generate a one-time password consistent with an embodiment of the present disclosure.

FIG. 3 illustrates a flowchart 300 of exemplary operations of a client device configured to generate a device-specific session OTP, consistent with an embodiment of the present disclosure. The operations of flowchart 300 may be performed by a client device, e.g., client device 102 and correspond to operation 222 of FIG. 2. In particular, flowchart 300 depicts exemplary operations configured to generate a session OTP to be provided to an authenticator to be used to authenticate client device at a next session. Program flow may begin with an indication that a session is ending 302. Operation 304 includes retrieving (capturing) selected device attributes. The specific device attributes captured may be based on session OTP rules. A new session OTP may be generated based, at least in part, on selected device attributes and session OTP rules at operation 306. Operation 308 includes storing the new session OTP in a local session OTP on the client device and providing the new session OTP to the authenticator. The session may then end at operation 310.

Figure 4:
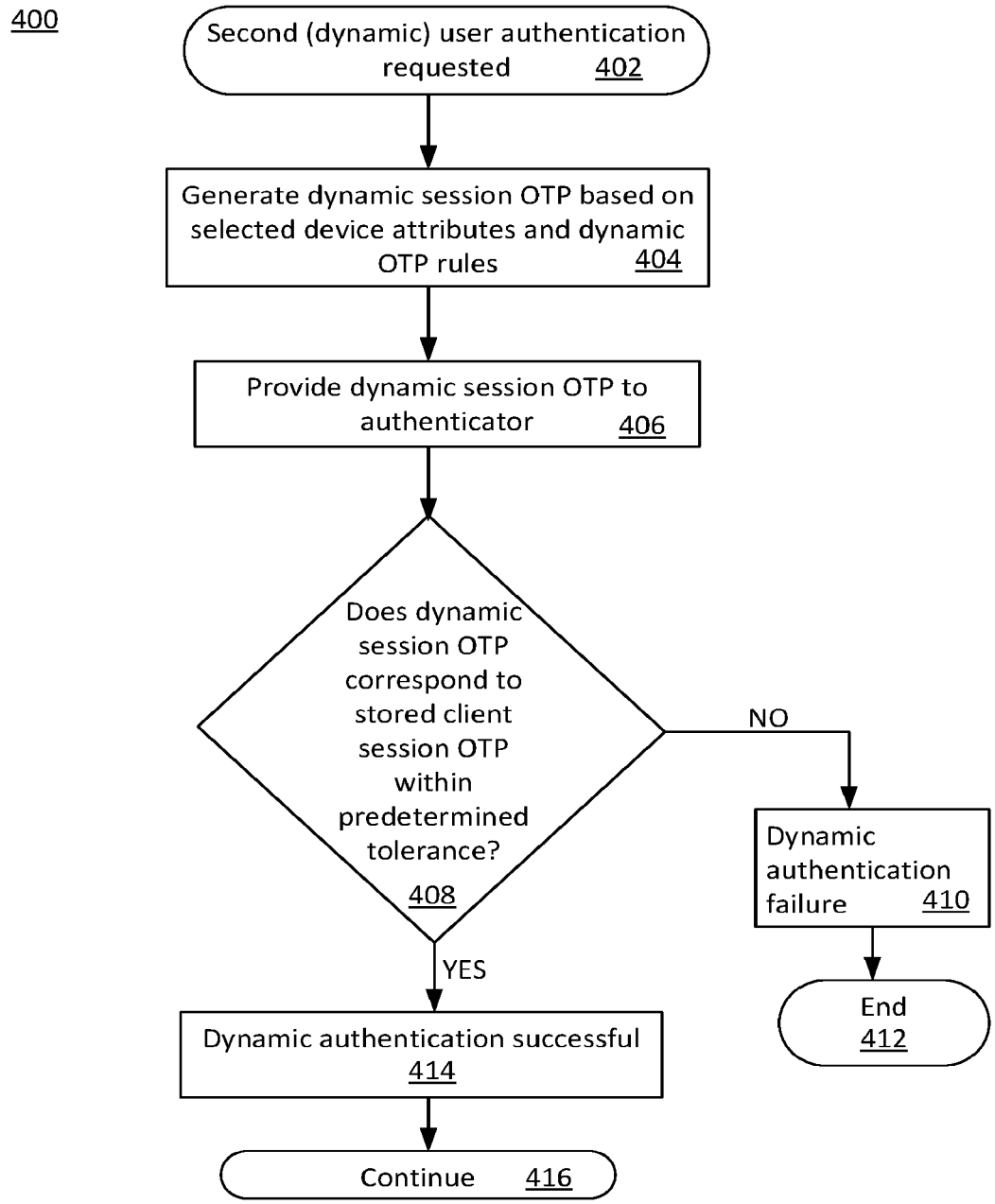
FIG. 4 illustrates another flowchart of exemplary operations of a device-specific one-time password authentication system configured to provide a second authentication consistent with various embodiments of the present disclosure.

FIG. 4 illustrates a flowchart 400 of exemplary operations of a device-specific OTP authentication system configured to provide a second authentication, consistent with an embodiment of the present disclosure. The operations of flowchart 400 may be performed by a client device, e.g., client device 102, and an authenticator, e.g., authenticator 108. In particular, flowchart 400 depicts exemplary operations configured to perform a second authentication using a second (dynamic) OTP generated at the time of the authentication based on device attributes. The operations of flowchart 400 may be included in operation 218 of FIG. 2. The operations of flowchart 400 may begin with a request for a second user authentication 402. Operation 404 may include generating a second (dynamic) session OTP based, at least in part, on selected device attributes and session OTP rules. The second (dynamic) session OTP may be provided to the authenticator at operation 406. Whether the dynamic session OTP corresponds to the stored client session OTP within a predetermined tolerance may be determined at operation 408. If the dynamic session OTP does not correspond to the stored client session OTP with the predetermined tolerance, the dynamic authentication may fail at operation 410 and the session may end at operation 412. If the dynamic session OTP corresponds to the stored client session OTP with the predetermined tolerance, the dynamic authentication may succeed at operation 414 and the session may continue at operation 416.

Thus, a client device may be authenticated to a private network and/or protected content using a session OTP generated based on a plurality of device attributes and session OTP rules. The plurality of device attributes are device-specific corresponding to a device "fingerprint". The device attributes may change over time and the device attributes selected for generating the session OTP may also change. Thus, each session OTP generated may be substantially unique and generally random. The session OTP may be generated during a current session for use to authenticate for a next session. Thus, the session OTP may correspond to a shared secret between the client device and the authenticator.

In some embodiments, a second dynamic authentication may be performed using a first session OTP generated prior to the authentication attempt and a second session OTP generated during the authentication attempt. The second session OTP is configured to verify the identity of the client device with a greater level of confidence. Since the second session OTP is generated at the time of the authentication and is not stored on the client device, the second session OTP is relatively more secure. Because the device attributes may have changed between generating the first session OTP and generating the second session OTP, some variation between the first session OTP and second session OTP may be expected. Tolerances and/or thresholds may thus be used to account for this variation.

While FIGS. 2 through 4 illustrate various operations according to one embodiment, it is to be understood that not all of the operations depicted in FIGS. 2 through 4 are necessary for other embodiments. Indeed, it is fully contemplated herein that in other embodiments of the present disclosure, the operations depicted in FIGS. 2 through 4 and/or other operations described herein may be combined in a manner not specifically shown in any of the drawings, but still fully consistent with the present disclosure. Thus, claims directed to features and/or operations that are not exactly shown in one drawing are deemed within the scope and content of the present disclosure.

Any of the operations described herein may be implemented in a system that includes one or more storage mediums having stored thereon, individually or in combination, instructions that when executed by one or more processors perform the methods. Here, the processor may include, for example, a client device CPU, a server CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

While the foregoing is prided as exemplary system architectures and methodologies, modifications to the present disclosure are possible. For example, memory, e.g., client device memory 114, authenticator memory and/or server memory may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively client device memory 114, authenticator memory and/or server memory may comprise other and/or later-developed types of computer-readable memory.

Client device 102 may be configured to communicate with network 106 and/or private network 104 using a variety of communication protocols. The communications protocols may include but are not limited to wireless communications protocols, such as Wi-Fi, 3G, 4G and/or other communication protocols. The communications protocols may comply and/or be compatible with other related Internet Engineering Task Force (IETF) standards.

The Wi-Fi protocol may comply or be compatible with the 802.11 standards published by the Institute of Electrical and Electronics Engineers (IEEE), titled "IEEE 802.11-2007 Standard, IEEE Standard for Information Technology-Telecommunications and Information Exchange Between Systems-Local and Metropolitan Area Networks-Specific Requirements—Part 11: Wireless LAN Medium Access Control (MAC) and Physical Layer (PHY) Specifications" published, Mar. 8, 2007, and/or later versions of this standard.

The 3G protocol may comply or be compatible with the International Mobile Telecommunications (IMT) standard published by the International Telecommunication Union (ITU), titled "IMT-2000", published in 2000, and/or later versions of this standard. The 4G protocol may comply or be compatible with IMT standard published by the ITU, titled "IMT-Advanced", published in 2008, and/or later versions of this standard.

Client device 102 may be capable of communicating with network 106 and/or private network 104 using a selected packet switched network communications protocol. One exemplary communications protocol may include an Ethernet communications protocol which may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in March, 2002 and/or later versions of this standard. Alternatively or additionally, client device 102 may be capable of communicating with network 106 and/or private network 104 using an X.25 communications protocol. The X.25 communications protocol may comply or be compatible with a standard promulgated by the International Telecommunication Union-Telecommunication Standardization Sector (ITU-T). Alternatively or additionally, client device 102 may be capable of communicating with network 106 and/or private network 104, using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, client device 102 may be capable of communicating with network 106 and/or private network 104, using an Asynchronous Transfer Mode (ATM) communications protocol. The ATM communications protocol may comply or be compatible with an ATM standard published by the ATM Forum titled "ATM-MPLS Network Interworking 1.0" published August 2001, and/or later versions of this standard. Of course, different and/or after-developed connection-oriented network communication protocols are equally contemplated herein.

"Circuitry", as used in any embodiment herein, may comprise, for example, singly or in any combination, hard-wired circuitry, programmable circuitry, state machine circuitry, and/or firmware that stores instructions executed by programmable circuitry. An application and/or module, as used in any embodiment herein, may be embodied as circuitry. The circuitry may be embodied as an integrated circuit, such as an integrated circuit chip.

Thus, a method and system for authenticating to a private network using a device-specific session OTP has been described. A client device is configured to generate a session OTP based at least in part on device attributes. The session OTP may be generated by the client device during a session when the device is connected to the private network. The session OTP may then be stored on the client device and provided to an authenticator associated with the private network. The session OTP may then be used to authenticate the client device to the private network at the next session. In an embodiment, a second authentication may be performed. In this embodiment, the client device may be configured to generate a second (dynamic) OTP, based on device attributes, at the time of the authentication. In this embodiment, the authenticator may be configured to decide a successful authentication if the second OTP is within a predetermined tolerance of the saved OTP provided by the client device during a prior session.

Thus, a client device may be authenticated to a private network with a potentially unique, random OTP based on device attributes. The user may then not be required to remember such a password. The user may authenticate to the client device and the client device may then authenticate to the private network. The second authentication is configured to provide a relatively more robust authentication that does not rely on a session OTP stored on the client device.

According to one aspect there is provided a method. The method may include generating a first one-time password (OTP) based at least in part on a plurality of client device attributes; and providing the first OTP to an authenticator associated with a private network during a first session, wherein the authenticator is configured to authenticate the client device to at least one of the private network and protected content included in the private network for a second session following the first session based on the provided first OTP.

According to another aspect there is provided a system. The system may include a client device and an authenticator. The client device is configured to generate a first one-time password (OTP) based at least in part on a plurality of client device attributes and to provide the first OTP to the authenticator associated with a private network during a first session, and the authenticator is configured to authenticate the client device to at least one of the private network and protected content included in the private network for a second session following the first session based on the provided first OTP.

According to another aspect there is provided a system. The system may include one or more storage mediums having stored thereon, individually or in combination, instructions that when executed by one or more processors result in the following operations including: generating a first one-time password (OTP) based at least in part on a plurality of client device attributes; and providing the first OTP to an authenticator associated with a private network during a first session, wherein the authenticator is configured to authenticate the client device to at least one of the private network and protected content included in the private network for a second session following the first session based on the provided first OTP.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A method comprising:
    performing, by a server computer, a first authentication of a client computing device during a first session based at least in part on a first one-time password (OTP) from the client computing device, the first OTP being based at least in part on a plurality of client device attributes associated with the client computing device, wherein the first OTP includes a secure hash value corresponding to the plurality of device attributes;
    storing, by the server computer, the first OTP;
    receiving, by the server computer, a request for a second authentication of the client computing device, the request for the second authentication being associated with a second OTP that is different than the first OTP; and
    granting, by the server computer, the request for the second authentication of the client computing device based at least in part on determining that a difference between the first OTP and the second OTP is less than a predetermined threshold.

2. The method of claim 1, further comprising generating the first OTP based on a predetermined OTP rule and the plurality of client device attributes associated with the client computing device.

3. The method of claim 1, wherein the request for the second authentication of the client computing device is a request to initiate a distinct second session.

4. The method of claim 1, further comprising:
    determining, by the server computer, that the second authentication is required in order for the first session to continue; and
    sending, by the server computer and responsive to the determining that the second authentication is required, an indication to the client computing device during the first session that the second authentication is required.

5. The method of claim 1, wherein the client device attributes comprise at least one of file system attributes, hardware features, and software configuration settings.

6. A system comprising:
    a memory;
    at least one processor coupled to the memory and configured to:
        perform a first authentication of a client computing device during a first session based at least in part on a first one-time password (OTP) from the client computing device, the first OTP being based at least in part on a plurality of client device attributes associated with the client computing device, wherein the first OTP includes a secure hash value corresponding to the plurality of device attributes;
        store the first OTP;
        receive a request for a second authentication of the client computing device, wherein the request for the second authentication is associated with a second OTP that is different than the first OTP; and
        grant the request for the second authentication of the client computing device based at least in part on a determination that a difference between the first OTP and the second OTP is less than a predetermined threshold.

7. The system of claim 6, wherein the at least one processor is further configured to generate the first OTP based on a predetermined OTP rule and the plurality of client device attributes associated with the client computing device.

8. The system of claim 6, wherein the at least one processor is further configured to:
    compare the first OTP with a previous OTP received during a previous session with the client computing device; and
    authenticate the first session based at least in part on determining that a difference between the previous OTP and the first OTP is less than the predetermined threshold.

9. The system of claim 6, wherein the at least one processor is further configured to:
    determine that the second authentication is required in order for the first session to continue; and
    responsive to the determination that the second authentication is required, send an indication to the client computing device during the first session that the second authentication is required.

10. The system of claim 6, wherein the client device attributes comprise at least one of file system attributes, hardware features, and software configuration settings.

11. A non-transitory computer-readable medium having a plurality of instructions stored thereon that when executed by at least one processor cause an authentication process to be carried out, the authentication process comprising:
    performing a first authentication of a client computing device during a first session based at least in part on a first one-time password (OTP) from the client computing device, the first OTP being based at least in part on a plurality of client device attributes associated with the client computing device, wherein the first OTP includes a secure hash value corresponding to the plurality of device attributes;
    storing the first OTP;
    receiving a request for a second authentication of the client computing device, wherein the request for the second authentication is associated with a second OTP that is different than the first OTP; and
    granting the request for the second authentication of the client computing device based at least in part on a determination that a difference between the first OTP and the second OTP is less than a predetermined threshold.

12. The non-transitory computer-readable medium of claim 11, wherein the authentication process further comprises generating the first OTP based on a predetermined OTP rule and the plurality of client device attributes associated with the client computing device.

13. The non-transitory computer-readable medium of claim 11, wherein the authentication process further comprises:
    comparing the first OTP with a previous OTP received during a previous authenticated session with the client computing device; and
    authenticating the first session based at least in part on determining that a difference between the previous OTP and the first OTP is less than the predetermined threshold.

14. The non-transitory computer-readable medium of claim 11, the authentication process further comprising:
    determining that the second authentication is required in order for the first session to continue; and
    responsive to determining that the second authentication is required, sending an indication to the client computing device during the first session that the second authentication is required.

15. The non-transitory computer-readable medium of claim 11, wherein the client device attributes comprise at least one of file system attributes, hardware features, and software configuration settings.

* * * * *